US007834919B2

(12) United States Patent
Yachi

(10) Patent No.: US 7,834,919 B2
(45) Date of Patent: Nov. 16, 2010

(54) IMAGING APPARATUS, IMAGING SIGNAL PROCESSING METHOD, AND PROGRAM FOR FLUCTUATION ELIMINATION IN AN IMAGE

(75) Inventor: Kiyotake Yachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 394 days.

(21) Appl. No.: 11/958,665

(22) Filed: Dec. 18, 2007

(65) Prior Publication Data

US 2008/0151067 A1 Jun. 26, 2008

(30) Foreign Application Priority Data

Dec. 26, 2006 (JP) ............................ P2006-350112

(51) Int. Cl.
*H04N 5/228* (2006.01)
*H04N 5/217* (2006.01)
*G06K 9/40* (2006.01)

(52) U.S. Cl. .................... 348/241; 348/208.6; 382/275; 382/262

(58) Field of Classification Search ................. 348/82, 348/83, 208.1, 208.3, 208.6, 241, 246; 382/260, 382/262, 275
See application file for complete search history.

(56) References Cited

U.S. PATENT DOCUMENTS

| 6,754,367 | B1 * | 6/2004 | Ito et al. ...................... 382/103 |
| 7,212,668 | B1 * | 5/2007 | Luo et al. ..................... 382/165 |
| 7,315,325 | B2 * | 1/2008 | Soupliotis et al. ......... 348/222.1 |
| 7,583,292 | B2 * | 9/2009 | Kondo et al. .............. 348/208.4 |
| 7,623,728 | B2 * | 11/2009 | Avinash et al. .............. 382/275 |
| 2005/0117035 | A1 * | 6/2005 | Hofflinger et al. .......... 348/241 |
| 2007/0273765 | A1 * | 11/2007 | Wang et al. ................. 348/152 |
| 2008/0129844 | A1 * | 6/2008 | Cusack et al. .............. 348/241 |
| 2009/0225183 | A1 * | 9/2009 | Tamura ................... 348/222.1 |

FOREIGN PATENT DOCUMENTS

JP 2006-107457 4/2006
WO WO 2005122094 A1 * 12/2005

* cited by examiner

*Primary Examiner*—John M Villecco
(74) *Attorney, Agent, or Firm*—Finnegan, Henderson, Farabow, Garrett & Dunner, L.L.P.

(57) ABSTRACT

An imaging apparatus includes: an imaging section; a moving-object detection processing section for detecting a moving object in a plurality of frame images captured by the imaging section; and a fluctuation-elimination processing section for masking a portion detected including the moving object by the moving-object detection processing section, and performing fluctuation elimination processing on an image of an area excluding the masked portion.

5 Claims, 5 Drawing Sheets

IMAGING APPARATUS, IMAGING SIGNAL PROCESSING METHOD, AND PROGRAM FOR FLUCTUATION ELIMINATION IN AN IMAGE

CROSS REFERENCES TO RELATED APPLICATIONS

The present invention contains subject matter related to Japanese Patent Application JP 2006-350112 filed in the Japanese Patent Office on Dec. 26, 2006, the entire contents of which are incorporated herein by reference.

BACKGROUND OF THE INVENTION

1. Field of the Invention

The present invention relates to an imaging apparatus formed as a video camera, an imaging-signal processing method applied to the imaging apparatus, and a program executing the imaging-signal processing method, and more particularly, to a technique for correcting fluctuations of images caused by fluctuations of air.

2. Description of the Related Art

To date, when a moving image is captured by a video camera, etc., the captured image sometimes fluctuates by the influence of a fluctuation of air. That is to say, air sometimes fluctuates locally because of the difference in temperature, and thus light path is locally refracted, resulting in a local fluctuation of a captured image in a screen by that influence. In particular, when a distant view is captured using a telescope, the distance from an object of shooting to a video camera is long, and thus the light path becomes long. Accordingly, there is a problem in that the fluctuation of an image being captured caused by the fluctuation of air appears seriously, and the fluctuation becomes conspicuous.

If a captured image has a fluctuation caused by air, an adverse effect arises in the image, for example a place originally to be a line shakes and is deformed. The fluctuation itself is a problem in the case of a moving image. However, in the case of capturing a still image, if there is a fluctuation, there is a problem in that a line is bent, and the like.

Japanese Unexamined Patent Application Publication No. 2006-107457 has disclosed the detection of an object excluding an influence of a fluctuation from an image signal obtained by capturing an image using an imaging apparatus. The "fluctuation" described in this patent document corresponds to the fluctuation of air described in this specification.

SUMMARY OF THE INVENTION

Incidentally, it is possible to eliminate the fluctuation of an image caused by the fluctuation of air by filter processing. However, if elimination processing is always performed on the entire captured image, the filter processing sometimes becomes unsuitable depending on the content of the image. Specifically, a fluctuation itself is a phenomenon in which coordinate positions of individual pixels constituting an image in a small local area vary. For fluctuation elimination processing, the variations of the coordinate positions should be corrected. Such processing is most effective in the case of a still state in which the positions of objects in an image are statically fixed. When an image includes a moving object, the detection of a fluctuation for the sake of the fluctuation elimination processing might not be performed correctly, because the image includes a different movement from a fluctuation, and thus the image quality might be deteriorated on the contrary.

The present invention has been made in view of these points, and it is desirable to successfully perform fluctuation elimination processing of an image caused by the fluctuation of air.

According to an embodiment of the present invention, there is provided a method of imaging signal processing, the method including the steps of: moving-object detection processing detecting a moving object in a plurality of captured frame images; masking a portion detected including the moving object by the step of moving-object detection processing; and fluctuation elimination processing performing fluctuation elimination processing on an image of an area excluding the masked portion.

In this manner, the image signal of the captured image excluding a moving object is subjected to fluctuation elimination processing against the fluctuation of air, and thus the fluctuation elimination processing is performed only on an area without movement in the captured image.

By the present invention, it becomes possible to perform fluctuation elimination processing only on an area without movement in the captured image. Accordingly, when an image in a screen fluctuates by the refraction of a light path because of a local fluctuation of air caused by the difference in temperature, etc., the fluctuation elimination processing is performed only on an area without movement, and thus the correction of the fluctuation is performed effectively without deteriorating the image quality of the captured image.

BRIEF DESCRIPTION OF THE DRAWINGS

FIG. 5A is a pictorial diagram before correction, and FIG. 5B is a pictorial diagram after correction.

DESCRIPTION OF THE PREFERRED EMBODIMENTS

In the following, a description will be given of an embodiment of the present invention with reference to the drawings.

Figure 1:
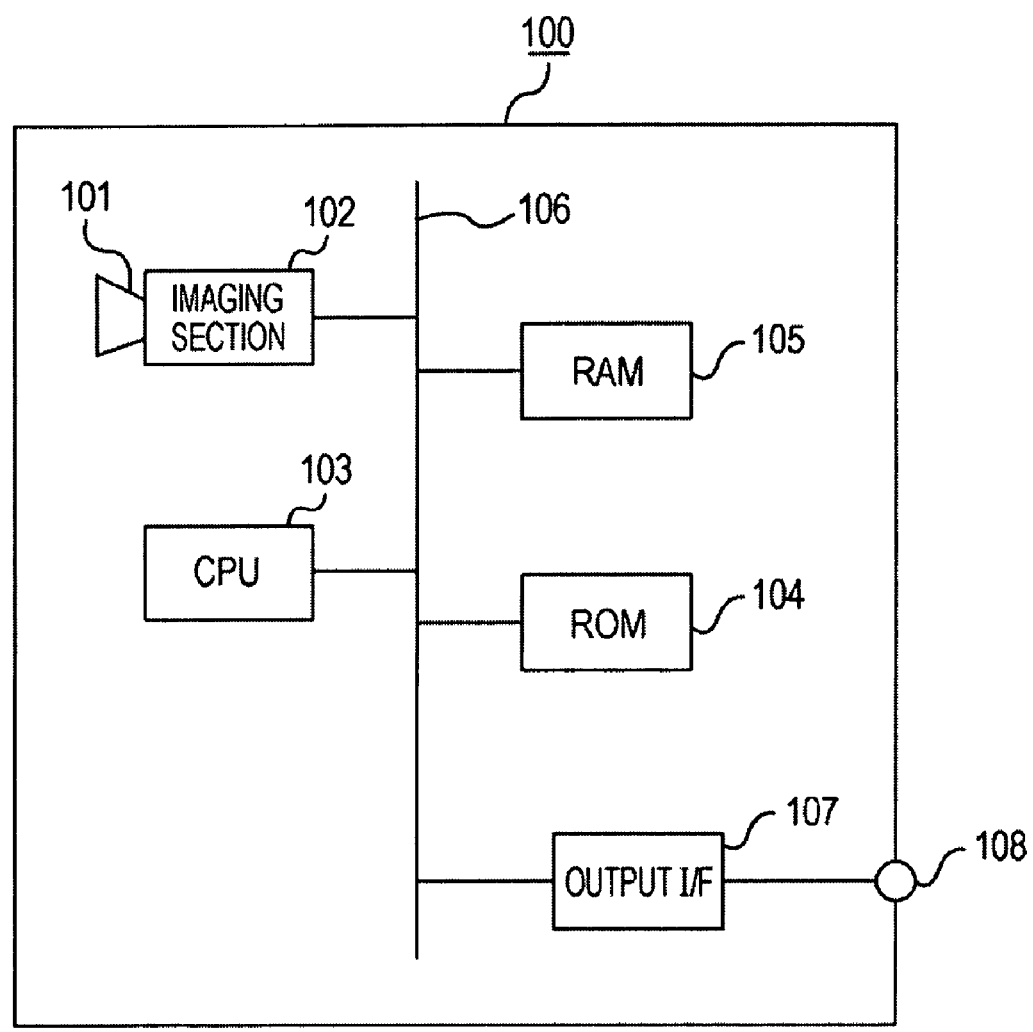
FIG. 1 is a block diagram illustrating an example of a configuration of an imaging apparatus according to an embodiment of the present invention.

FIG. 1 illustrates an example of a configuration of an imaging apparatus 100 according to the present embodiment. The imaging apparatus 100 of the present embodiment can be applied to an imaging apparatus for use in various applications, such as a monitoring video camera, for example. Referring to FIG. 1, a description will be given of the configuration. The imaging apparatus 100 forms image light of an object of shooting on an imager (not shown in the figure) of an imaging section 102, and converts the image light into an electrical signal by the imager through an optical system 101 including a capturing lens, etc. For the capturing lens included in the optical system 101, for example a telescopic lens having a relatively long focal length is used. Alternatively, a zoom lens capable of varying the setting of a focal length may be used.

For a imager, various imaging devices, for example CCD (Charge Coupled Devices) imaging devices, MOS (Metal Oxide Semiconductor) imaging devices, etc., can be applied.

The imaging section 102 performs imaging signal processing which produces an imaging signal (image signal) in a predetermined format from the electrical signal obtained by the imager. The imaging section 102 outputs one-frame imaging signal (image signal) at a predetermined frequency, such as 30 Hz, etc. The image signal output by the imaging section 102 is transferred to a RAM 105 and is once stored there through a bus line 106 in the imaging apparatus 100. The RAM 105 is capable of storing a plurality of frames (a plurality of sheets) of image signal necessary for fluctuation elimination processing described below, and the like. The image signal stored in the RAM 105 is subjected to various image processing by operation processing under the control of a central processing unit (CPU) 103. The image processing performed under the control of the central processing unit 103 is carried out by executing programs stored in a ROM 104.

The present embodiment includes fluctuation elimination processing of an image as one of processing of an image signal performed using the central processing unit 103 and the RAM 105. The fluctuation eliminated by this fluctuation elimination processing of an image is the fluctuation elimination processing in the case where a fluctuation arises in an image by the refraction of a light path because of a local fluctuation of air caused by a difference in temperature, etc. The processing is different from correction processing uniformly performed on the entire image, such as so-called camera shake compensation, etc. This fluctuation elimination processing is executed by filter processing, for example called a time median filter. A description will be given later of a specific example of the fluctuation elimination processing by the time median filter.

The image signal which has been stored in the RAM 105 and has been subjected to various image processing, such as the fluctuation elimination processing, etc., is sent to an output interface section 107, and is output as an imaging signal (image signal) in a predetermined format from an output terminal section 108. Also, if the output terminal section 108 is a terminal which is connected to a predetermined communication line, the image signal is transmitted through the communication line.

Figure 2:
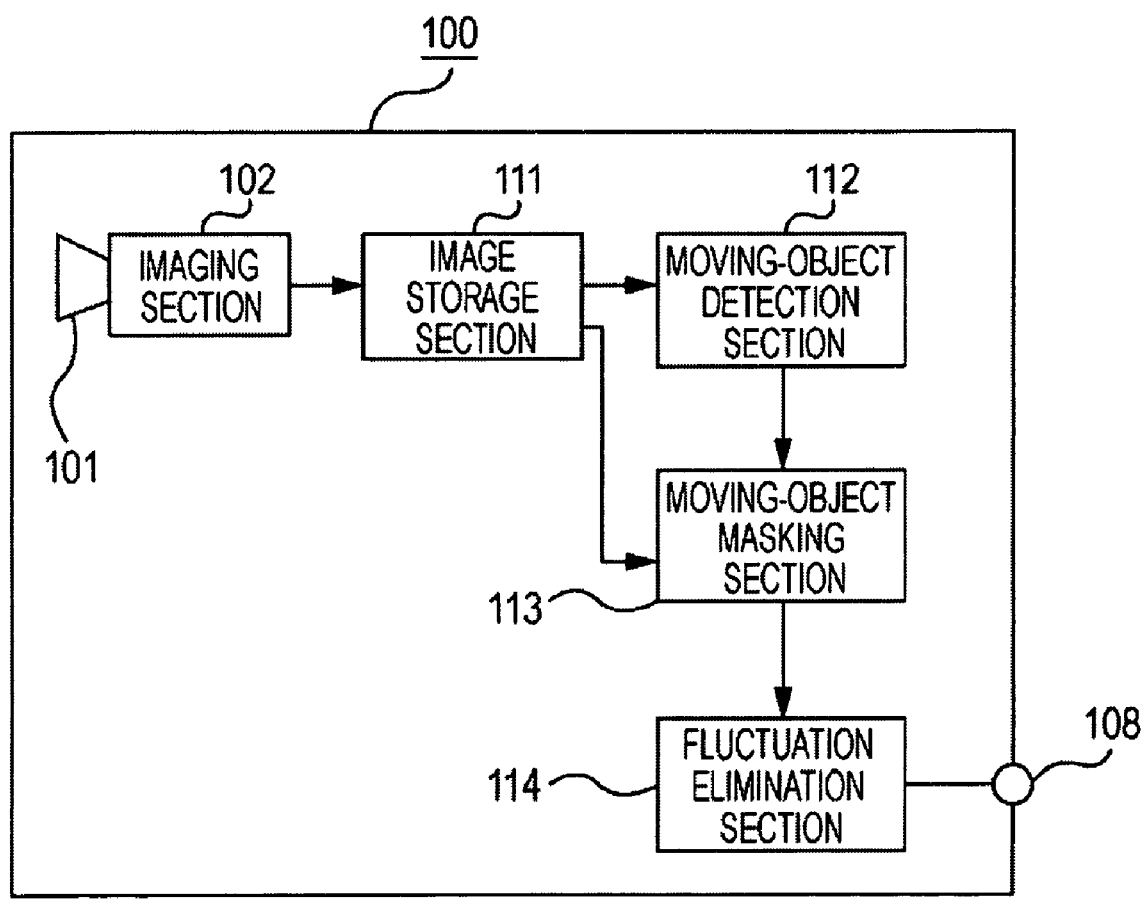
FIG. 2 is a configuration diagram illustrating an example of a functional block of an imaging apparatus according to an embodiment of the present invention.

FIG. 2 is a functional block diagram illustrating the configuration of the fluctuation elimination processing of the imaging apparatus 100 shown in FIG. 1. In the present embodiment, when a moving object is captured, if an image in a screen fluctuates by the refraction of a light path because of a local fluctuation of air caused by the difference in temperature, etc., the processing for correcting the fluctuation of the image in the screen due to that influence is performed to generate an image without a fluctuation.

In order to generate an image without the fluctuation, as shown in FIG. 2, the image signal output by the imaging section 102 is stored in an image storage section 111. The RAM 105 in FIG. 1 is used for the image storage section 111. The contents of the image shown by the image signal stored in the image storage section 111 is determined by a moving object detection section 112 on whether there is a moving object in the image. If it is determined that there is a moving object in the image, a moving-object masking section 113 performs processing for masking the image portion of the moving object. A fluctuation-elimination processing section 114 performs fluctuation elimination processing on the image of the area excluding the masked portion by the moving-object masking section 113.

Figure 3:
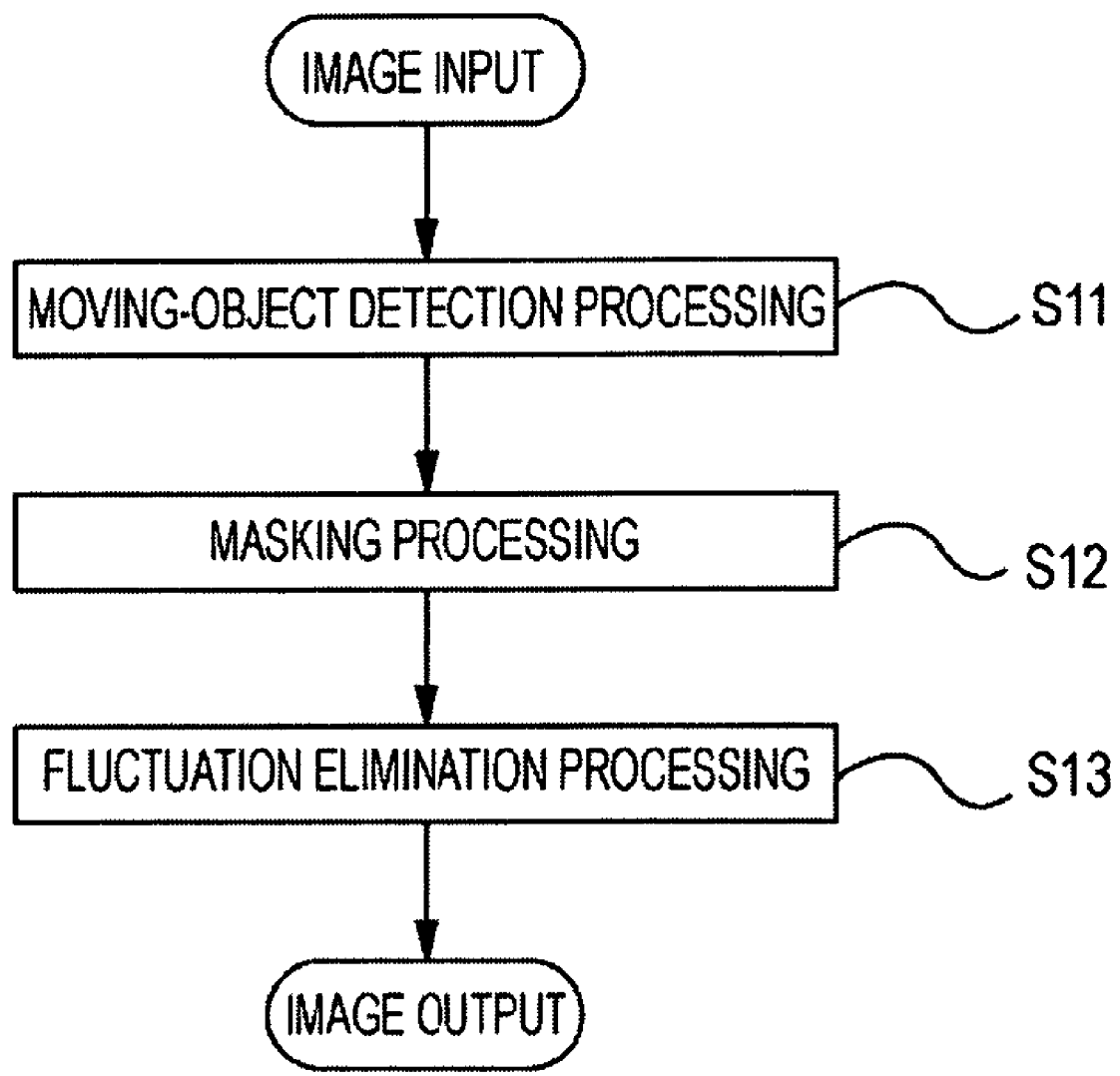
FIG. 3 is a flowchart illustrating an example of fluctuation elimination processing (an example in the case of a moving image) according to an embodiment of the present invention.

FIG. 3 is a flowchart illustrating an example of fluctuation elimination processing performed by the imaging apparatus 100. When the image signal obtained by capturing an image is input from the imaging section 102, detection processing of a moving object in the input image is performed (step S11). For the detection processing of the moving object, moving-object detection processing on a fluctuation by a robust moving-object detection algorithm is used. Also, when performing moving-object detection processing, a moving object having a certain size or more (the size mentioned here is a size determined, for example by the number of pixels), and a moving object having a size less than that size may be disregarded even if it is a moving object. Also, for the amount of movement, an object moving at a speed of a predetermined threshold value or more is regarded as a moving object, and an object moving at a speed less than the threshold value may be disregarded here.

When a moving object is detected in step S11, masking processing which masks the portion including the moving object in the image is performed in order not to use that portion for the fluctuation elimination processing described below (step S12). In the case of an image including no moving object, the masking processing in step S12 is not performed. The range to be subjected to the masking processing is an area of a moving object, and thus the range for the masking processing varies for each one frame.

The fluctuation elimination processing is performed on the image signal having been subjected to the masking processing (step S13). At this time, the masked area by the masking processing is excluded, and then the fluctuation elimination processing is performed. If there is no masked area, the fluctuation elimination processing, which eliminates a fluctuation due to the fluctuation of air, is performed on the entire one frame. The fluctuation elimination processing is performed, for example using a time median filter. A description will be given of an example of the fluctuation elimination processing using a time median filter later.

The image signal from which a fluctuation is eliminated in this manner is output from an output terminal 108 of the imaging apparatus 100. In this regard, for the area masked by the masking processing by the fluctuation elimination processing in step S13, the pixel values of the input image are directly output. The image signal output from the imaging apparatus is subjected to image processing in accordance with an intended use of the imaging apparatus, such as storage processing in a storage medium, transmission processing through a communication line, display processing onto a monitor, and the like.

Here, a description will be given of the fluctuation elimination processing using a time median filter. The time median filter is a filter for performing the processing expressed by the following Expression 1.

$$I_M(x,y,t) = \text{med } S(x,y,t) \ S(x_N, y_N, t_N) = \{I(x_N, y_N, t) | t_N - T \leq t \leq t_N\} \quad \text{Expression 1}$$

In Expression 1, $I_M$ is a pixel value of an output image. I is a pixel value of an input image, and T is a time constant of a filter. Also, x and y represents an x-coordinate value and a y-coordinate value, respectively.

The processing by the time median filter calculates a statistical representative value of pixel values of each pixel, and output each pixel data using the calculated statistical representative value. That is to say, the fact that a pixel value $I_M(x, y, t)$ of an output image is expressed by a med $S(x, y, t)$ means that the pixel value is output as a median value of the pixel values at time T. The selection of the time constant T of the filter determines how many past frames are used for calculation. By determining the time constant T of the filter to be an appropriate time (the number of frames), the fluctuation elimination processing using the time median filter is performed properly. For example, using a few past frames of an image, the processing for calculating a median value of the pixel values of each pixel among the few frames is performed. By performing the fluctuation-elimination processing using the principle of this time median filter on all the pixels in one image individually, the variation of the pixel value in an image can be corrected, and thus the variation of the pixel value due to a fluctuation of air can be eliminated.

In this regard, the fluctuation-elimination processing mentioned here eliminates a fluctuation caused by a fluctuation of air, and thus detects a very little fluctuation in a small area in the vicinity of the pixel for each pixel. The processing is different from correction processing on the entire image, such as camera shake compensation.

In this embodiment, as shown in the flowchart in FIG. 3, etc., a moving portion is detected, the detected moving portion is masked, and then is subjected to fluctuation elimination processing. Thus, only the pixels in an area other than a moving portion is subjected to the fluctuation elimination processing using the time median filter shown in Expression 1.

Accordingly, when performing the fluctuation elimination processing, a discrimination is made on whether the variation of the pixel value in an image is due to a fluctuation of air or due to the other causes (for example, the case where a moving object enters into a screen, etc.). Thus, it is possible to obtain successfully corrected image without deteriorating the quality even if a moving object, etc., is captured while eliminating a fluctuation of the image due to a fluctuation of air.

Figure 5A:
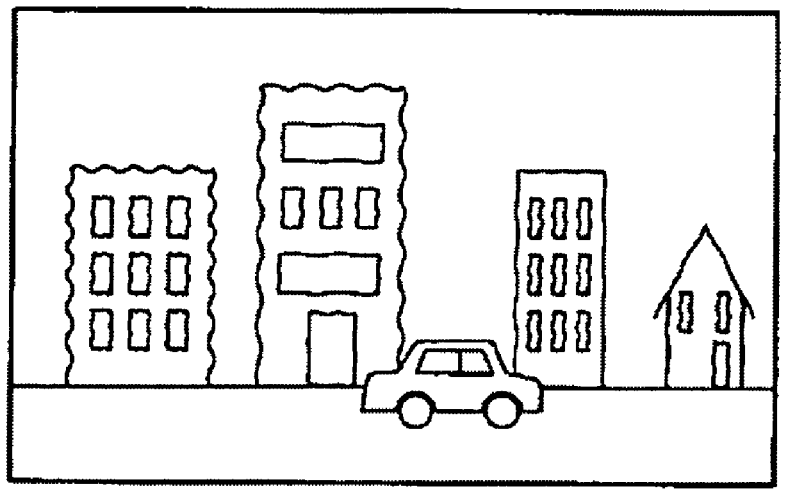
FIGS. 5A and 5B are pictorial diagrams illustrating a processing image according to an embodiment of the present invention.
Figure 5B:
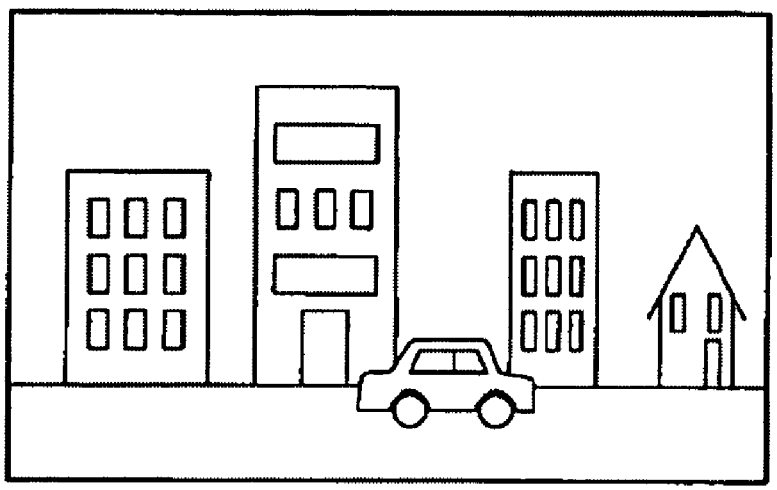

FIGS. 5A and 5B are principle diagrams illustrating an example of a state in which the fluctuation elimination processing is performed in this manner. FIG. 5A is an example of the case where a fluctuation is not corrected. This case shows a state in which a moving object (automobile) has entered into an image captured with a building in a distant view being distorted. By performing the fluctuation elimination processing on such an image, as shown in FIG. 5B, the distortion of the building in the distant view is corrected, fluctuations are eliminated, and a moving object (automobile) is included. For the automobile, which is a moving object in the image, a fluctuation occurs in the image depending on the position thereof. However, the distortion of a moving object is less conspicuous than that of a still object, and thus the image is recognized as a good quality image.

In this regard, as mentioned above, for the detection processing of the moving object by step S11 in the flowchart in FIG. 3, a robust moving-object detection algorithm is used. For example, Japanese Unexamined Patent Application Publication No. 2006-107457 includes the description of an example of a moving-object detection processing of such a fluctuation using a robust moving-object detection algorithm. That is to say, the difference value between the image of the current time and the past image group of the past few frames is calculated. When making a calculation in this manner and viewing the change, if there is no object at a certain coordinate position in an image, the difference value continues to be a very small. In contrast, if an object enters into a certain coordinate position in the image, the difference value changes greatly. Assuming that the current time is t, if an object enters at time t−Δt, and there is still the object, the difference value before time t−Δt becomes large, and the difference value after time t−Δt becomes small. On the other hand, if there is a fluctuation of air, the difference value varies randomly.

Accordingly, if a moving object has entered, a state of having a large difference value continues for a constant period of time. Thus, the difference value is subjected to threshold-value processing, and if a state of exceeding the threshold value continues for a constant period of time, a determination is made that there is an object. For example, if the threshold value has exceeded for 0.5 second or more during the past one second, a determination is made that there is an object. If there is a fluctuation of air or the like, a state of exceeding the threshold value does not continue, and thus a determination is not made that there is an object. By performing such processing on all of or a part of the pixels in an image, the pixels including a moving object is detected. By performing labeling by combination processing with adjacent pixels, etc., a moving object area can be extracted.

By applying such an algorithm, it is possible to detect a moving object successfully while excluding the influence of a fluctuation.

In this regard, the processing shown by the flowchart in FIG. 3 is based on the assumption of an example of an image signal of a moving image, which is output from the imaging apparatus 100 at a constant frame cycle. However, the processing can also be applied to the case of shooing a still image.

Figure 4:
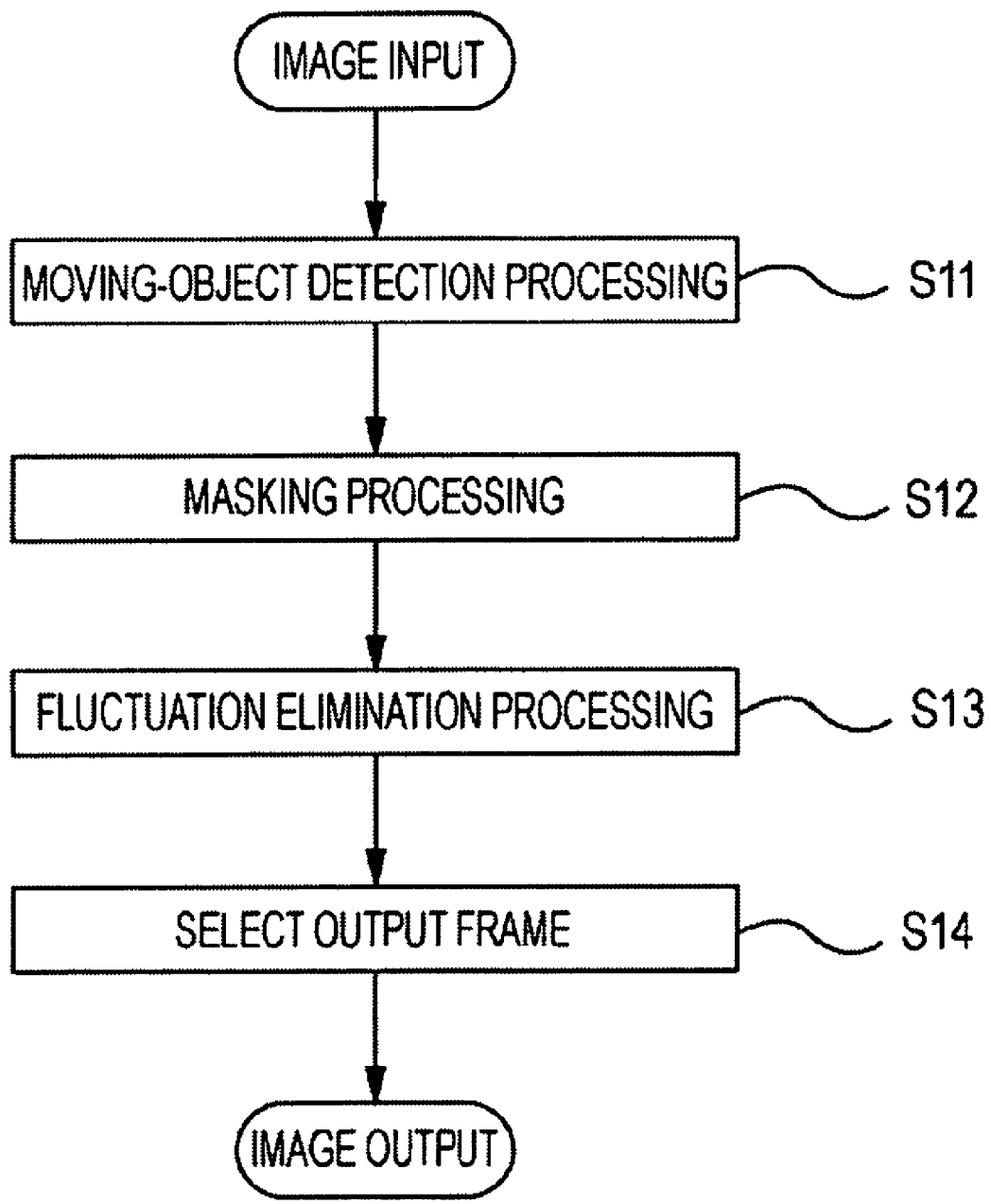
FIG. 4 is a flowchart illustrating an example of fluctuation elimination processing (an example in the case of a still image) according to an embodiment of the present invention.

FIG. 4 is a flowchart illustrating an example of the processing in the case of a still image. In the following, a description will be given on the basis of FIG. 4. The processing from step S11 to step S13 is basically the same as the processing in FIG. 3. That is to say, when an image signal is input, detection processing of a moving object in an image is performed (step S11). If a moving object is detected in step S11, the portion including the moving object in the image is subjected to masking processing to be masked in order not to be used for the fluctuation elimination processing described below (step S12). Then, the fluctuation elimination processing is performed on the image signal having been subjected to masking processing (step S13). For the fluctuation elimination processing, for example, processing using the time median filter described above is also applied.

After that, the image signal of one frame is selected from the image signal that has been subjected to the fluctuation elimination processing as a still image to be output, and the image signal of that one frame is output from the output terminal section 108 (step S14). For this selection processing, for example, the image may be displayed on a display unit provided with the imaging apparatus 100, etc., and may be selected by the user operation. Alternatively, an appropriate image may be automatically selected. Also, the fluctuation elimination processing in step S13 and the selection processing in step S14 may be linked, and only the image signal of the frame to be output as a still image may be subjected to the fluctuation elimination processing, and the image signal of the other frames may not be subjected to the fluctuation elimination processing, resulting in the reduction of the amount of the calculation processing on the fluctuation elimination processing.

By performing the fluctuation elimination processing of the present embodiment on a still image in this manner, it is possible to effectively output a high-quality image signal from which the deformation of an object of shooting due to a fluctuation of air is eliminated.

In this regard, in the embodiment described so far, the present invention has been applied to, as an example, an imaging apparatus having the configuration shown in FIG. 1. However, an image processing apparatus may be configured such that an image signal output from an imaging apparatus (video camera) is subjected to the fluctuation elimination processing with the processing configuration described above. In this manner, by configuring as a single information processing apparatus, it is possible to correct a fluctuation of the image signal output from an existing imaging apparatus with high image quality.

Also, in the above-described embodiment, the processing using a time median filter is applied for the fluctuation elimination processing. However, the fluctuation elimination processing may be carried out by the other data processing. The moving-object detection processing is not limited to the processing configuration described above.

Furthermore, in the above-described embodiment, a description has been given of an example in which the moving-object detection processing and the fluctuation elimination processing are performed by hardware. However, an image processing program (software) performing the same processing as described above may be created. The program may be installed in an information processing apparatus, such as a computer, etc., and the information processing apparatus may perform the same processing. In this case, the image processing program may be distributed using a various storage medium, such as a disc, a semiconductor memory, etc., and may also be downloaded through a transmission path, such as the Internet, etc.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an imaging section;
    a moving-object detection processing section for detecting a moving object in a plurality of frame images captured by the imaging section; and
    a fluctuation-elimination processing section for masking a portion detected including the moving object by the moving-object detection processing section, and performing fluctuation elimination processing on an image of an area excluding the masked portion.

2. The imaging apparatus according to claim 1,
    wherein the fluctuation elimination processing in the fluctuation-elimination processing section performs filter processing on a plurality of pieces of image data to obtain a statistical representative value of pixel values of each pixel, and outputs each pixel data by the obtained statistical representative value.

3. The imaging apparatus according to claim 1,
    wherein the fluctuation-elimination processing section performs elimination processing using a time median filter.

4. A method of imaging signal processing using an imaging apparatus, comprising the steps of:
    moving-object detection processing detecting a moving object in a plurality of captured frame images;
    masking a portion including the moving object detected by the step of moving-object detection processing; and
    fluctuation elimination processing performing fluctuation elimination processing on an image of an area excluding the masked portion.

5. A computer-readable storage medium storing a program which, when executed by a central processing unit, performs image processing, the image processing comprising the steps of:
    moving-object detection processing detecting a moving object in a plurality of captured frame images;
    masking a portion including the moving object detected by the step of moving-object detection processing; and
    fluctuation elimination processing performing fluctuation elimination processing on an image of an area excluding the masked portion.

* * * * *